March 22, 1938. J. KRONSBEIN 2,112,164
MEANS FOR CONVEYING METALLIC ARTICLES THROUGH APPARATUS FOR ELECTROPLATING
Filed July 10, 1937 2 Sheets-Sheet 1
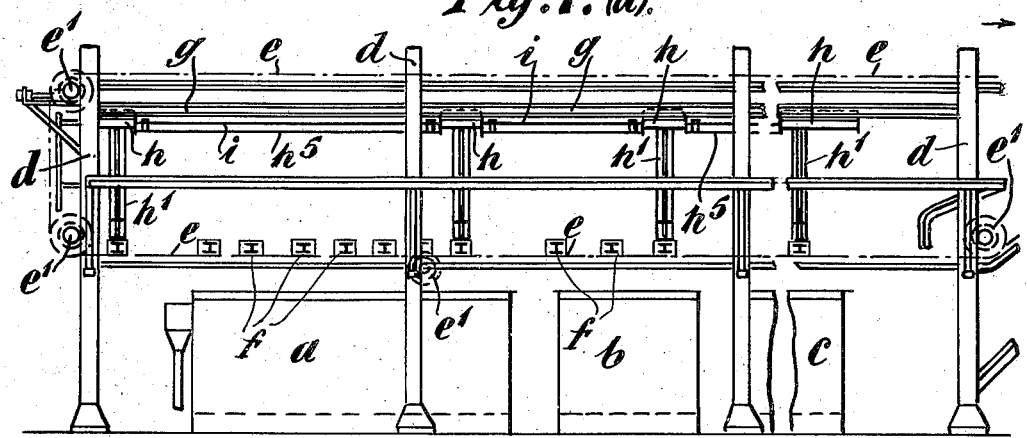
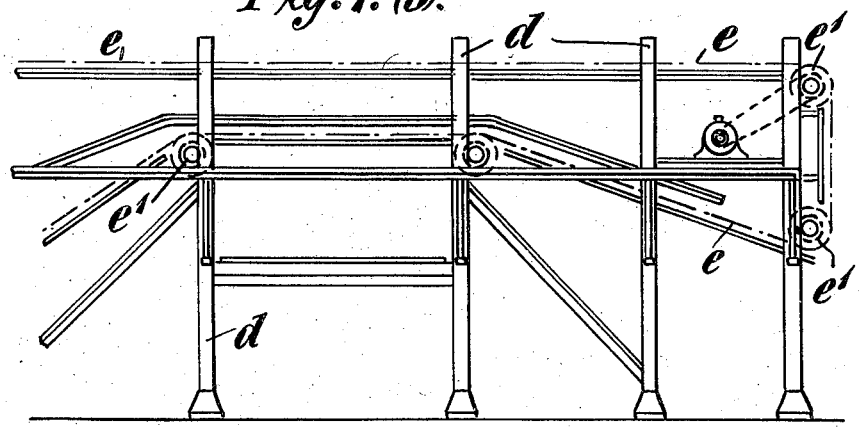
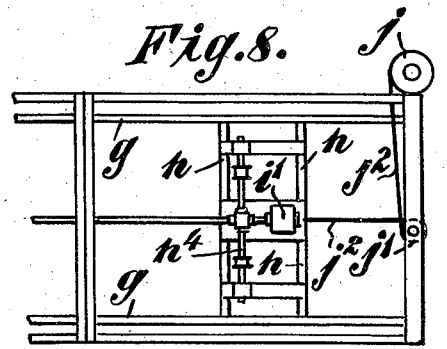
Inventor:- John Kronsbein.
Per:- George E. Folkes
Attorney.

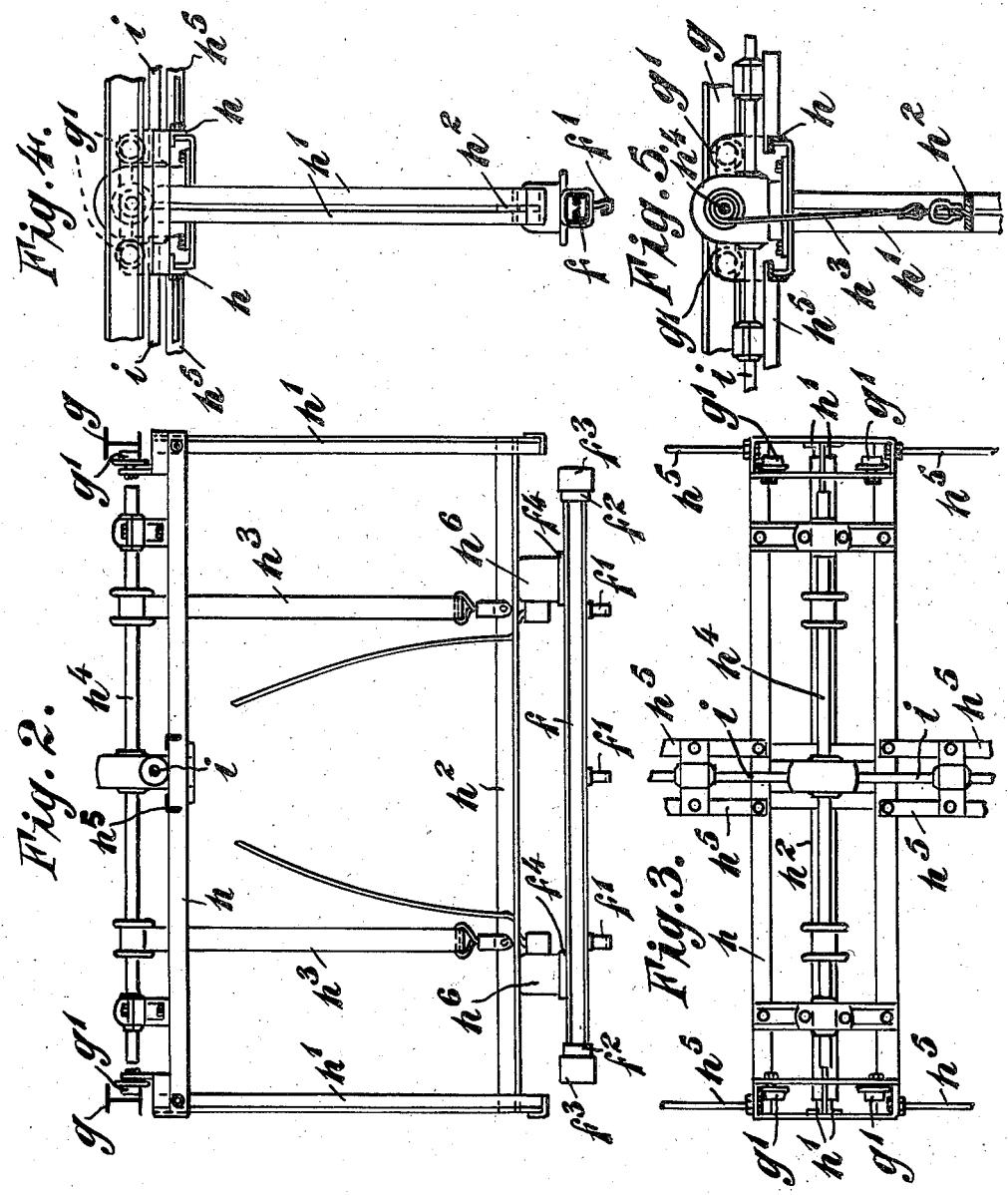

Patented Mar. 22, 1938

2,112,164

UNITED STATES PATENT OFFICE 2,112,164

MEANS FOR CONVEYING METALLIC ARTICLES THROUGH APPARATUS FOR ELECTROPLATING

John Kronsbein, Birmingham, England, assignor of one-half to The Brightside Plating Company Limited, Birmingham, England, a British company Application July 10, 1937, Serial No. 152,953
In Great Britain July 9, 1936

3 Claims. (Cl. 214—17)

The present invention has relation to means for conveying metallic articles through apparatus for electro-plating, pickling, cleaning, dip painting, enamelling and the like.

The present invention also has relation to apparatus of the kind wherein the articles to be treated are suspended from a carrier bar which is moved by a conveyor system over a sequence of tanks and is periodically elevated and depressed by appropriate mechanism to bring the articles into the tanks, and ensure their endlong passage therethrough and withdrawal for cleansing, etching, plating, and the like.

With such previously proposed apparatus difficulties have arisen with regard to the general synchronization of the various movements sometimes caused by stretching of conveyor chains and the like, and the present invention has for its object not only to overcome or considerably lessen the aforesaid liability, but to ensure a particularly satisfactory immersion, submerged movement, withdrawal and speedy transfer of the articles for obtaining maximum plating efficiency or treatment.

According to the present invention there is provided apparatus for electro-plating metallic articles, comprising a sequence of tanks, an endless conveyor chain or like system supporting carrier bars for the articles and disposed substantially horizontally above said sequence of tanks, a travelling trolley elevator mechanism associated with each tank, said mechanism providing for the elevation, transference and depression of the carrier bar from and to the conveyor, so that the articles are transferred from one tank to another.

In order that this invention may be clearly understood and more readily carried into practice, reference may be had to the appended drawings, upon which:—

Figures 1ª and 1ᵇ illustrate an apparatus constructed according to the present invention in side elevation.

Figure 2 is a front view of one section of the conveyor or transferring mechanism.

Figure 3 is a plan view of the said section.

Figure 4 is a side elevational view of the section.

Figure 5 is a fragmentary sectional elevation of the said section.

Figures 6 and 7 illustrate the conveyor bar hereinafter referred to.

Figure 8 illustrates operating mechanism for shifting the sequence of conveyors or trolleys in one direction.

In a convenient embodiment of the present invention a sequence of tanks are placed upon the floor in alignment, as for instance a cleaner tank, cold swill tank, acid etching tank, cold swill tank, nickel tank, cold swill tank, and hot swill tank three tanks $a\ b\ c$ being shown. Mounted around and above the sequence of tanks is a superstructure $d$ which may have footways on each side for operators and which primarily supports side by side endless chain conveyors $e$ carried upon chain wheels $e^1$, the conveyor chains being appropriately supported at other desired positions. The lower parts of the conveyor chains pass immediately above the upper extremities of the tanks $a\ b\ c$ somewhat laterally thereof and on to these conveyor chains carrier bars $f$ (Figures 1, 2, 4, 6 and 7) hereinafter more particularly referred to are placed, from which bars $f$ the articles to be treated are suspended as at $f^1$ (Figures 2 and 4). It is necessary for these bars $f$ to be elevated at times from the conveyor chain $e$ which may run along angle-section guide rails and to this end a travelling trolley elevator mechanism is provided. Conveniently horizontal parallel rails $g$, see particularly Figure 2 are provided in the upper part of the superstructure whereon cross members $h$ are suspended by means of twin rollers $g^1$ at each extremity. From these cross members channel or slotted arms $h^1$ extend vertically downwardly wherein a vertically movable cross member $h^2$ is slidably operable, the said movable cross member $h^2$ being connected by winding straps $h^3$ to a shaft $h^4$ rotatably mounted on the main cross member $h$ in the plane thereof. Travelling trolley elevator mechanism such as that described and shown in Figures 2 and 3 is associated with each tank and the plurality of shafts $h^4$ are connected together by a longitudinal shaft $i$ which runs the entire length of the superstructure and is provided with an electric motor $i^1$ (Figure 8) the connection between the longitudinal shaft $i$ and the transverse shafts $h^4$ being of a worm and worm wheel character, it being appreciated that by actuation of the motor $i^1$ the slidable cross member $h^2$ may be elevated and depressed in its guides. It is however not only necessary to elevate and depress the slidable cross member $h^2$ but the articles need to be conveyed from one tank to another and to this end the entire sequence of elevators are displaceable by means of the twin roller devices $g^1$ along the superstructure, this operation being effected by pulley and cable or like mechanism such as $j\ j^1\ j^2$ Figure 8, at one extremity and actuated by a motor (not shown) to shift the trolleys toward the right in said Figure 8. A similar mechanism may be employed at the other extremity to shift the trolleys to the left. The cables $j^2$ may be operated by a common motor or by two motors properly controlled,—suitable arrangement for this being obvious and forming no part of the present invention. The slidable cross member is adapted to engage with a carrier bar $f$ on the conveyor chain $e$ and such engagement may be of a mechanical nature or of a magnetic character. The trolley mechanisms $h$, $h^1$, $h^2$, $h^3$ and $h^4$ are interconnected by members $h^5$.

In operation therefore it will be appreciated that the articles are suspended from the carrier bars $f$ on the endless conveyors $e$ and the interconnected overhead trolley or conveyor mechanisms $h$, $h^1$, $h^2$, $h^3$, and $h^4$ are such that the lower cross bars $h^2$ engage carrier bars $f$ and raise same, following which the carrier bars are moved horizontally by cable $j^2$ and finally downwardly into the next adjacent tank by the motor $i^2$ whence the endless conveyor takes up its duty and moves the articles through the particular tank in question. In this manner the articles may be speedily conveyed from one tank to the other and time periods may be arranged whereby when the articles have been elevated away from the liquid there shall be sufficient time for the liquid concerned to drip back into the tank.

The conveyor bar $f$ may be of H-section as shown in Figures 6 and 7 and a rubber sleeve of hollow H-section $f^2$ is slid or passed on to the extremities thereof. A square section sleeve $f^3$ is then slid on to the rubber sleeve $f^2$ and is closed in by suitable pressure to conform to the H-section and consolidate the whole. Alternatively a hollow H-section sleeve or metallic sleeve may be passed on to the rubber and consolidated by pressure. The outer metallic sleeves $f^3$ rest upon the travelling conveyor $e$ and the articles are suspended from the central part of the conveyor bar at $f^1$. $h^6$ are electromagnets adapted to cooperate with armature plates $f^4$ on the bar $f$.

I claim:—

1. In apparatus of the character described, in combination with a plurality of aligned tanks and a superstructure associated therewith, a series of trolleys movably mounted on said superstructure for linear travel above the tanks, an elevator individual to and carried by each trolley for vertical movement with respect thereto, common actuating means for all the elevators of the series, and means for simultaneously shifting all of the trolleys.

2. In apparatus of the character described, in combination with a plurality of aligned tanks and a superstructure associated therewith, an elongated carriage movably mounted on said superstructure for linear travel above the tanks and including a plurality of spaced elevator guides, a plurality of elevators mounted in said guides, common actuating means mounted on said carriage to operate said elevators simultaneously, and means for shifting said carriage and its elevators as a unit linearly of the tanks.

3. In apparatus of the character described, in combination with a sequence of tanks and a framework carrying parallel conveyors adjacent the sides of the sequence of tanks, a series of transverse carrier bars normally supported at their ends by said conveyors; a superstructure forming part of said framework and arranged linearly above the tanks; a pair of trolley rails secured to said superstructure substantially directly above said conveyors; a plurality of trolleys each comprising an elevator frame shiftable longitudinally of the rails and having vertical guides, a laterally and horizontally disposed lifting bar operable vertically of said guides, and mechanism for raising and lowering the lifting bar, the several mechanisms comprising devices mounted on the frames and intercoupled for actuation from a common power source to thus intertie the plurality of trolleys for travel in unison on said rails; means for shifting the intertied trolleys; and means for coupling said lifting bars to said carrier bars.

JOHN KRONSBEIN.